United States Patent
Matthews, Jr. et al.

(10) Patent No.: US 12,102,198 B2
(45) Date of Patent: Oct. 1, 2024

(54) PROTECTIVE COVER FOR LAPTOP COMPUTER

(71) Applicant: Gamber-Johnson LLC, Stevens Point, WI (US)

(72) Inventors: John R. Matthews, Jr., Hamilton, OH (US); Walter P. Rothan, Cincinnati, OH (US); Steven M. Gibson, Loveland, OH (US)

(73) Assignee: Gamber-Johnson LLC, Stevens Point, WI (US)

( * ) Notice: Subject to any disclaimer, the term of this patent is extended or adjusted under 35 U.S.C. 154(b) by 0 days.

(21) Appl. No.: 18/324,821

(22) Filed: May 26, 2023

(65) Prior Publication Data

US 2023/0292897 A1    Sep. 21, 2023

Related U.S. Application Data

(63) Continuation of application No. 17/188,463, filed on Mar. 1, 2021, now Pat. No. 11,659,907.

(51) Int. Cl.
*A45C 11/00*    (2006.01)
*G06F 1/16*    (2006.01)

(52) U.S. Cl.
CPC ............ *A45C 11/00* (2013.01); *G06F 1/1616* (2013.01); *A45C 2011/003* (2013.01); *G06F 2200/1633* (2013.01)

(58) Field of Classification Search
CPC ........... G06F 1/1616; G06F 2200/1633; G06F 1/1656; A45C 11/00; A45C 2011/003; H04B 1/3888

USPC .... 206/320, 1.5, 576, 523, 521; 361/679.02, 361/679.01, 679.55, 683
See application file for complete search history.

(56) References Cited

U.S. PATENT DOCUMENTS

| | | |
|---|---|---|
| 3,125,873 A | 3/1964 | Robinson |
| 4,673,100 A | 6/1987 | Reis et al. |
| 5,310,049 A | 5/1994 | Bigelow et al. |
| 5,632,373 A | 5/1997 | Kumar et al. |
| 5,901,840 A | 5/1999 | Nakasuji |
| 6,006,941 A | 12/1999 | Hitchings |
| 6,109,434 A | 8/2000 | Howard, Jr. |
| 7,414,833 B2 | 8/2008 | Yapong |
| 7,643,274 B2 | 1/2010 | Bekele |
| 7,850,390 B2 * | 12/2010 | Lisbona ............. B01D 46/0004 403/231 |
| 7,886,903 B1 | 2/2011 | Wurzelbacher et al. |
| 7,907,400 B2 | 3/2011 | Bekele |

(Continued)

*Primary Examiner* — Chun Hoi Cheung
(74) *Attorney, Agent, or Firm* — Michael Best & Friedrich LLP

(57) ABSTRACT

A protective cover for an electronic device including a shell having upright sides that position the electronic device within the shell, a first slot and a second slot formed in the upright sides of the shell, a removable locking clip selectively coupled to the upright sides and including a first flange and a second flange that are receivable within the first slot and the second slot, respectively, a first hole extending through a portion of the upright sides, and a second hole extending through a portion of the upright sides. The removable locking clip overlaps a first portion of the electronic device when the electronic device is received within the shell and the first and second flanges are received within the first and second slots, respectively.

20 Claims, 10 Drawing Sheets

(56) References Cited

U.S. PATENT DOCUMENTS

| | | | |
|---|---|---|---|
| 8,289,703 B2 | 10/2012 | Bekele | |
| 8,393,466 B2 * | 3/2013 | Rayner | H05K 5/06 |
| | | | 206/320 |
| 8,638,555 B2 | 1/2014 | Bekele | |
| 8,767,385 B2 | 7/2014 | Richardson et al. | |
| 8,817,457 B1 | 8/2014 | Colby et al. | |
| 8,955,678 B2 * | 2/2015 | Murphy | H04B 1/3888 |
| | | | 206/320 |
| 9,549,598 B2 * | 1/2017 | Rayner | A45C 13/008 |
| 9,700,112 B1 * | 7/2017 | Samson | A45C 11/00 |
| 10,159,320 B2 * | 12/2018 | Armstrong | A45C 13/008 |
| 10,234,898 B2 | 3/2019 | Bekele | |
| 11,408,551 B2 | 8/2022 | Chapuis et al. | |
| 2002/0101707 A1 | 8/2002 | Canova, Jr. et al. | |
| 2004/0266498 A1 | 12/2004 | Qin et al. | |
| 2009/0080153 A1 | 3/2009 | Richardson et al. | |
| 2010/0110629 A1 | 5/2010 | Dietz et al. | |
| 2012/0081876 A1 | 4/2012 | Kaneko | |
| 2013/0206633 A1 * | 8/2013 | Jensen | A45C 11/00 |
| | | | 206/521 |
| 2014/0092531 A1 | 4/2014 | Trinh et al. | |
| 2016/0139635 A1 | 5/2016 | Gibson et al. | |
| 2016/0338459 A1 | 11/2016 | Yow et al. | |
| 2018/0234127 A1 | 8/2018 | Lambert et al. | |
| 2021/0165448 A1 | 6/2021 | Turner | |
| 2022/0273081 A1 | 9/2022 | Matthews et al. | |

\* cited by examiner

PROTECTIVE COVER FOR LAPTOP COMPUTER

CROSS-REFERENCE TO RELATED APPLICATIONS

This application is a continuation of U.S. patent application Ser. No. 17/188,463, filed on Mar. 1, 2021, the entire contents of which are incorporated by reference herein.

FIELD OF THE INVENTION

The invention relates to a protective cover for a laptop computer having a screen portion and an attached keyboard portion. The protective cover comprises a bottom shell for the keyboard portion of the computer, a top shell for the screen portion of the computer, or both a bottom shell for the keyboard portion and a top shell for the screen portion of the computer.

The industry has produced laptop computers of various designs, including ones in which the screen can be rotated about the keyboard in a "tablet" mode. Many new laptops are 360 degrees foldable such that the screen can be folded back completely behind the keyboard. Such computers may be carried to and used wherever needed. However, the broad field of use of laptop computers subjects them to an increased risk of physical damage during transport and use, particularly for laptops that are fully foldable or have rotatable screens.

Covers designed for laptop computers are typically made from plastic moldings. The complex shape needed to accommodate various internal components and connectors for external cables and the like dictate that the plastic be readily moldable and dimensionally stable over an extended period of time. Plastics meeting these requirements tend to be somewhat brittle. As a consequence, dropping an unprotected laptop onto a hard surface may break its cover and damage internal components.

Laptop computers are commonly provided to students by schools. Schools often opt to protect the laptops from drops and impacts by installing protective covers that snap onto the laptops. These protective covers may have top and/or bottom shells with snaps or tabs around the perimeter to grip the display and/or keyboard portions of the laptop. However, such protective covers can be easily removed by students or the snaps or tabs may break if the computer is dropped on a hard surface, rendering the computer protection ineffective. New 360 degrees foldable laptops may also lack space and edges to adequately secure rear and side snaps or tabs on protective covers.

U.S. Pat. No. 6,109,434, Howard Jr., discloses an improved protective case for a laptop computer that has a flexible hinge to accommodate opening and closing the computer and the case while the two remain attached to each other U.S. Pat. No. 7,414,833 discloses a case said to enable use of a laptop computer keyboard, display and ports located on a back edge of the computer while the computer remains in the case.

U.S. Pat. No. 8,817,457 discloses a reversible folio for a tablet computer having a shell with a cavity that removably receives the tablet computer.

U.S. Pat. No. 7,643,274 discloses an exterior cover for a laptop computer, which includes a first rigid planar element for placement on an outside surface of the display portion and a second rigid planar element for placement on an outside surface of the keyboard portion. The first rigid planar element includes a raised edge along a perimeter of the first rigid planar element, and a plurality of tabs located on the raised edge, wherein each tab extends from the raised edge for gripping the display portion. The second rigid planar element includes a raised edge extending toward the keyboard portion, and a plurality of tabs for gripping the keyboard portion.

U.S. Patent Application Publication 2016/0139635 A1 discloses a protective case for a hybrid computer having a removable screen and a separable keyboard, where the case comprises a bottom shell, a top shell and a flexible hinge attached to the rear of the bottom shell. The top shell can remain attached to the removable screen and the bottom shell can remain attached to the keyboard when the removable screen is separated from the keyboard.

While the above cases and covers may work for their intended purposes, there is a continuing need for an improved protective cover for a laptop computer having a screen portion and an attached keyboard portion, particularly 360 degrees foldable laptops and laptops having a screen that can be rotated about the keyboard.

SUMMARY OF THE INVENTION

The present invention is directed to, in one aspect, a protective cover for an electronic device including a shell having upright sides that extend around at least a portion of a periphery of the shell. The upright sides position the electronic device within the shell. The protective cover includes a first slot and a second slot formed in the upright sides of the shell, a removable locking clip selectively coupled to the upright sides and including a first flange and a second flange that are receivable within the first slot and the second slot, respectively, a first hole disposed within the first slot and extending through the upright sides, and a second hole disposed within the second slot and extending through the upright sides. The first hole is configured to receive a first screw. The second hole is configured to receive a second screw. The removable locking clip overlaps a first portion of the electronic device when the electronic device is received within the shell and the first and second flanges are received within the first and second slots, respectively. The shell is inhibited from being separated from the electronic device when the first screw is received within the first hole and engaged with the first flange, and the second screw is received within the second hole engaged with the second flange.

The present invention is directed, in another aspect, a protective cover for an electronic device including a shell having upright wall sections extending upward from the shell and encasing at least a portion of the electronic device, a plurality of slots disposed along the upright wall sections with each of the plurality of slots including a hole extending through the upright wall sections, and at least one removable locking clip having a body portion, a first flange, and a second flange. The first and second flanges are receivable within a pair of adjacent slots of the plurality of slots. The first flange and the second flange are both disposed between the upright wall sections and the electronic device when the removable locking clip is coupled to the shell. The main body overlaps a first portion of the electronic device to inhibit the electronic from being removed from the shell.

The present invention is directed to, in another aspect, a protective cover for an electronic device including a shell having an upright wall section that forms a cavity configured to receive the electronic device, a plurality of slots disposed along the upright wall section with each of the plurality of slots defining a slot axis, and at least one removable locking clip having a first flange and a second flange. The first and second flanges are receivable within a pair of adjacent slots of the plurality of slots along the slot axis. A plurality of holes extend through the upright wall section along a direction perpendicular to the slot axis. The plurality of holes are disposed within the plurality of slots and configured to receive fasteners. The first flange and the second flange are both disposed between the upright wall section and the electronic device when the removable locking clip is coupled to the shell. The fasteners fixedly couple the removable locking clip to the shell to inhibit the electronic device from being separated from the shell.

DETAILED DESCRIPTION OF THE INVENTION

Figure 1:
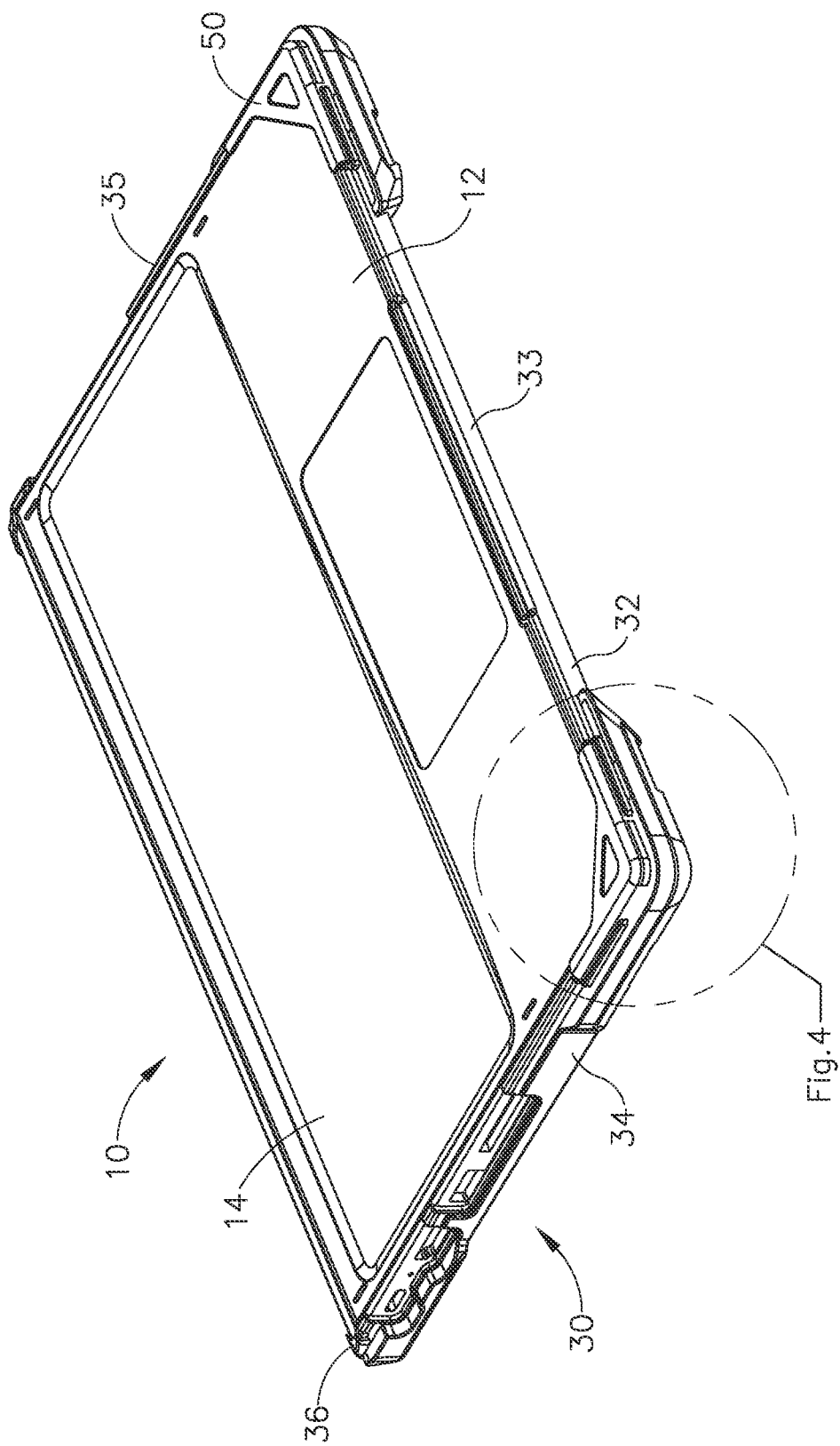
FIG. 1 is a perspective view of a keyboard portion of a laptop computer inside a protective cover of the invention.
Figure 2:
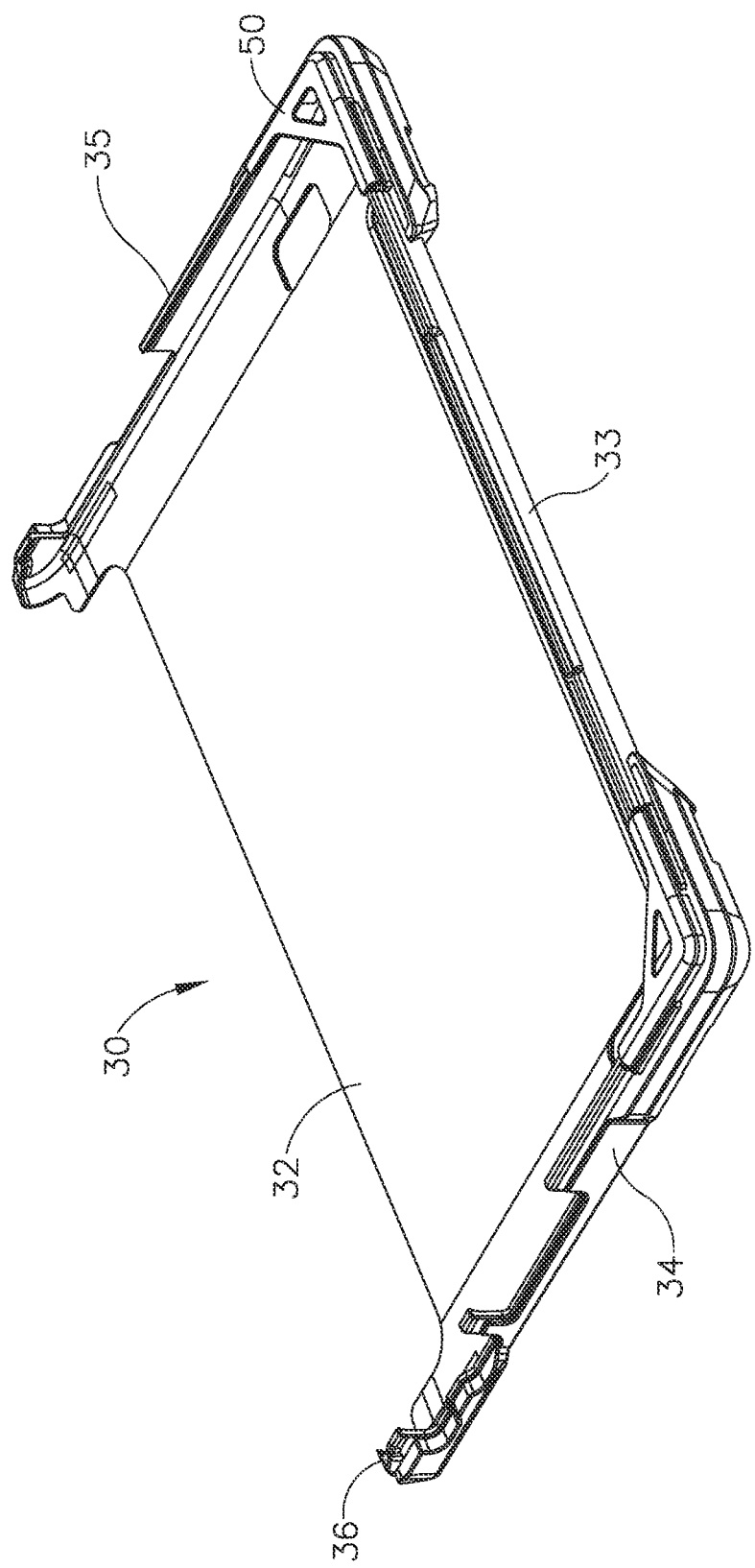
FIG. 2 is a perspective view of the protective cover for the keyboard portion of the computer of FIG. 1.
Figure 3:
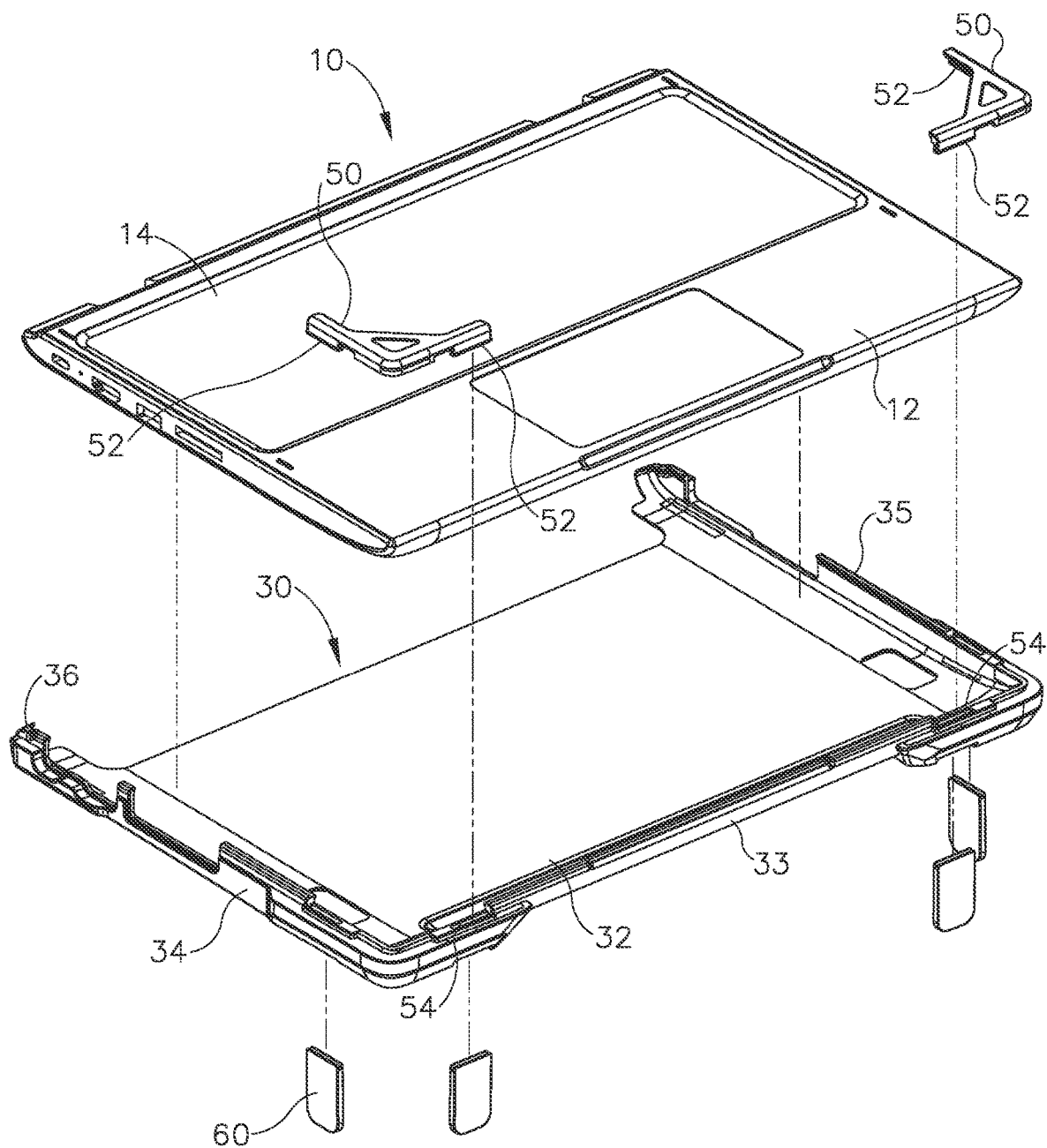
FIG. 3 is an exploded perspective view of the keyboard portion and protective cover of FIG. 1.
Figure 4:
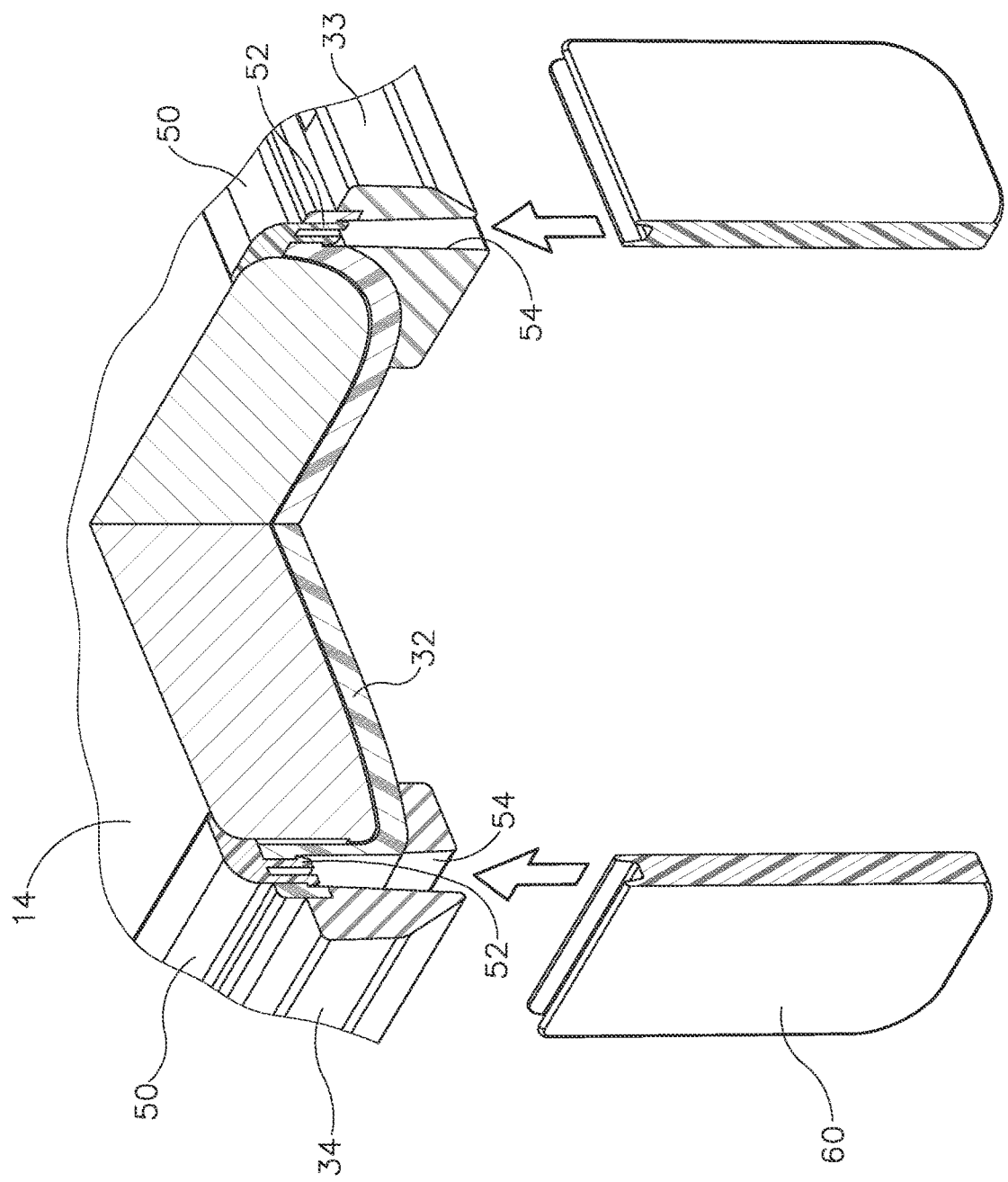
FIG. 4 is an enlarged, cut away sectional view of part of the keyboard portion and protective cover of FIG. 1.
Figure 5:
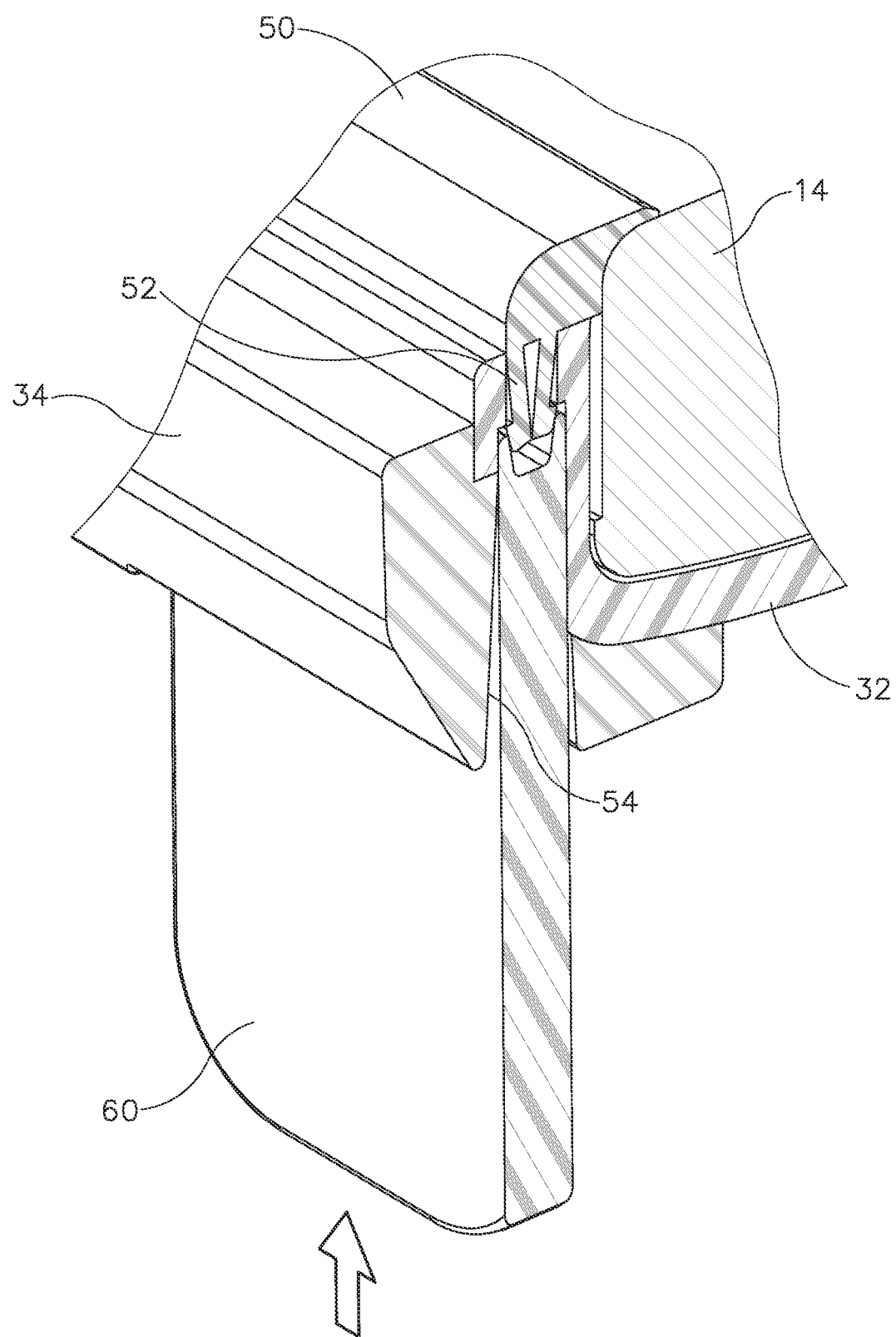
FIG. 5 is an enlarged sectional view of part of the keyboard portion and protective cover of FIG. 1, with a tool inserted into a slot in the bottom shell of the cover to compress protruding flanges of the removable locking clip to unlock the bottom shell from the keyboard portion.
Figure 6:
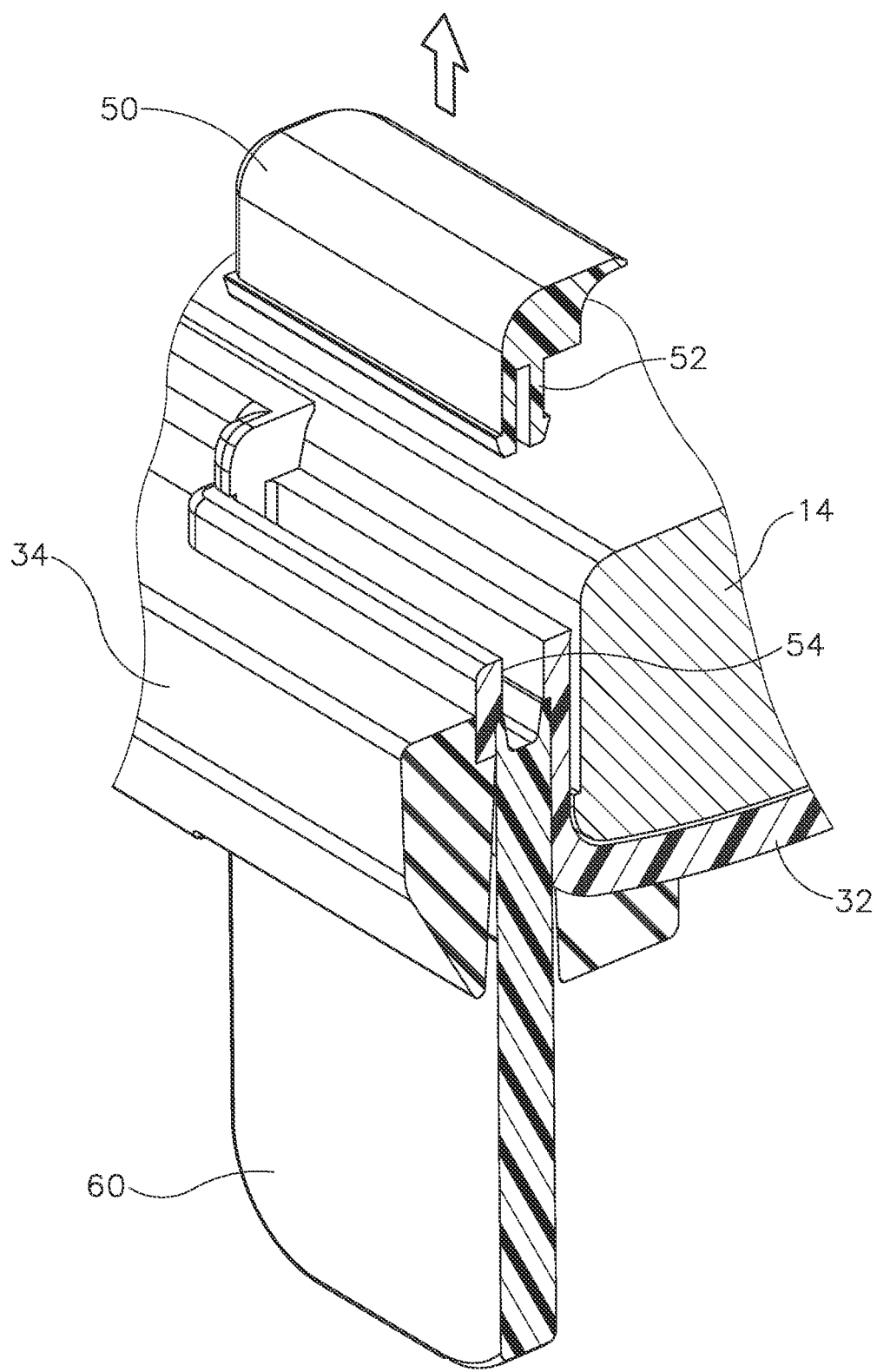
FIG. 6 is an enlarged sectional view of part of the keyboard portion and protective cover of FIG. 1, with the locking clip removed to unlock the bottom shell of the cover from the keyboard portion.

The protective cover of the present invention is designed to protect a laptop computer having a screen portion and an attached keyboard portion, particularly laptops that are fully foldable or have rotatable screens, from damage during transportation, storage and use. The cover provides such protection without interfering with normal operation of the computer.

In one embodiment, the protective cover comprises a planar bottom shell for placement on a bottom surface of the keyboard portion of the laptop computer. The bottom shell has front, left and right sides and a rear side that wraps around the rear of the keyboard portion to prevent it from moving backward. The protective cover further comprises at least one removable locking clip that attaches to the front, left or right side of the bottom shell when the keyboard portion is placed in the bottom shell. The at least one removable locking dip has at least one protruding flange that inserts into at least one slot in the front, left or right side of the bottom shell to internally lock the bottom shell to the keyboard portion. The at least one protruding flange is typically made of a resilient, flexible plastic material. Since the bottom shell is internally locked to the keyboard portion, it cannot be easily removed by users and has no exposed retaining snaps or tabs that may break if the computer is dropped. This internal locking feature is particularly useful on 360 degrees foldable laptops that lack space and edges to secure conventional protective shells or covers having rear and side snaps or tabs around the perimeter to grip the computer.

In another embodiment, the protective cover comprises a planar top shell for placement on a top surface of the screen portion of the laptop computer. The top shell has front, left and right sides and a rear side that wraps around the rear of the screen portion to prevent it from moving backward. The protective cover further comprises at least one removable locking clip that attaches to the front, left or right side of the top shell when the top shell is placed on the screen portion. The at least one removable locking clip has at least one protruding flange that inserts into at least one slot in the front, left or right side of the top shell to internally lock the top shell to the screen portion. The at least one protruding flange is typically made of a resilient, flexible plastic material. Since the top shell is internally locked to the screen portion, it cannot be easily removed by users and has no exposed retaining snaps or tabs that may break if the computer is dropped. This internal locking feature is particularly useful on 360 degrees foldable laptops that lack space and edges to secure conventional protective shells or covers having rear and side snaps or tabs around the perimeter to grip the computer.

In another embodiment, the protective cover comprises both the above bottom shell for placement on a bottom surface of the keyboard portion, and the above top shell for placement on a top surface of the screen portion. Both the bottom shell and the top shell can be separably attached to the computer. The screen portion of the computer, with or without the top shell attached, can be raised or lowered without interfering with the keyboard portion with the bottom shell attached. Similarly, the screen portion of the computer with the top shell attached can he raised or lowered without interfering with the keyboard portion, with or without the bottom shell attached. The bottom shell can also be separated from the keyboard portion while the top shell remains attached to the screen portion, and the top shell can be separated from the screen portion while the bottom shell remains attached to the keyboard portion, all while the screen and keyboard portions remain attached. The bottom shell and/or top shell can be quickly and easily removed or attached to the computer while it remains in assembled mode.

The protective cover, including its bottom shell and/or top shell and at the least one removable locking clip, is typically made of a resilient plastic material that helps protect the computer if it is dropped onto a hard surface or a heavy object is placed on top of it. The protective cover may further comprise structural components having a rigid layer, a resilient layer, and/or fabric layer(s). A rigid layer helps maintain the flat configuration if the computer is dropped onto a hard surface or a heavy object is placed on top of it. A resilient layer absorbs energy if the computer is dropped onto a hard surface. A fabric layer(s) provides convenient means of construction, by sewing, and a durable outside surface material.

Other advantages of the present invention will be understood and appreciated by reference to the following detailed description and the appended claims and drawings. It should be noted that terminology referring to or suggesting orientation of either a laptop computer or the protective cover describes orientation with respect to the position of a user, who has positioned the computer on his/her lap or on a work area in front of himself/herself A keyboard portion of a typical laptop computer 10 is shown in FIG. 1. In one example, when closed, the computer is about 11.5 inches wide by 7.5 inches top-to-bottom by 0.5 inches thick. The size of the protective cover of the invention can be adjusted to accommodate larger or smaller laptop computers. The computer 10 is comprised of two major components, a bottom 12 which houses a keyboard portion 14 (keys not shown) and may house other components, cable connectors and disk drives, and a screen portion (not shown), which houses the display screen and may house other components and connectors of the computer. The bottom and screen portion of the computer are connected by a suitable hinge, as known in the art.

The laptop computer 10 can be effectively operated while it is inside a protective cover of the invention, such as protective cover 30 shown in FIG. 1. The protective cover 30 comprises a planar bottom shell 32 for placement on a bottom surface of the keyboard portion 14. The bottom shell 32 has a front side 33, a left side 34, a right side 35, and a rear side 36 that wraps around the rear of the keyboard portion 14 to prevent it from moving backward. The protective cover further comprises at least one removable locking clip that attaches to the front, left or right side of the bottom shell when the keyboard portion is placed in the bottom shell. The at least one removable locking dip has at least one protruding flange that inserts into at least one slot in the front, left or right side of the bottom shell to internally lock the bottom shell to the keyboard portion. In the example shown in FIGS. 1-6, the protective cover 30 comprises two removable corner locking clips 50 that have protruding flanges 52 that insert into slots 54 in the front, left and right sides of the bottom shell to internally lock the bottom shell to the keyboard portion.

The protective cover 30 typically further comprises a planar top shell for placement on a top surface of the screen portion of the laptop computer. The top shell has a front side, a left side, a right side, and a rear side that wraps around the rear of the screen portion to prevent it from moving backward. The protective cover further comprises at least one removable locking clip that attaches to the front, left or right side of the top shell when the top shell is placed on the screen portion. The at least one removable locking clip has at least one protruding flange that inserts into at least one slot in the front, left or right side of the top shell to internally lock the top shell to the screen portion. In one example, the protective cover 30 comprises two removable corner locking dips, such as locking clips 50, that have protruding flanges, such as protruding flanges 52, that insert into slots, such as slots 54, in the front, left and right side of the top shell to internally lock the top shell to the screen portion.

In another embodiment, a tool can he inserted into the at least one slot in the bottom shell to compress the at least one protruding flange of the at least one removable locking clip to unlock the bottom shell from the keyboard portion, and/or the tool can be inserted into the at least one slot in the top shell to compress the at least one protruding flange of the at least one removable locking clip to unlock the top shell from the screen portion. In the example shown in FIGS. 3-6, tool 60 can be inserted into slots 54 in the front, left and right sides of the bottom shell to compress the protruding flanges 52 of the removable locking clips 50 to unlock the bottom shell 32 from the keyboard portion 14. The same tool or a different tool can be inserted into the at least one slot in the top shell to compress the at least one protruding flange of the at least one removable locking clip to unlock the top shell from the screen portion. The tool may, or may not, be integrated into the protective cover for the laptop computer.

Figure 7:
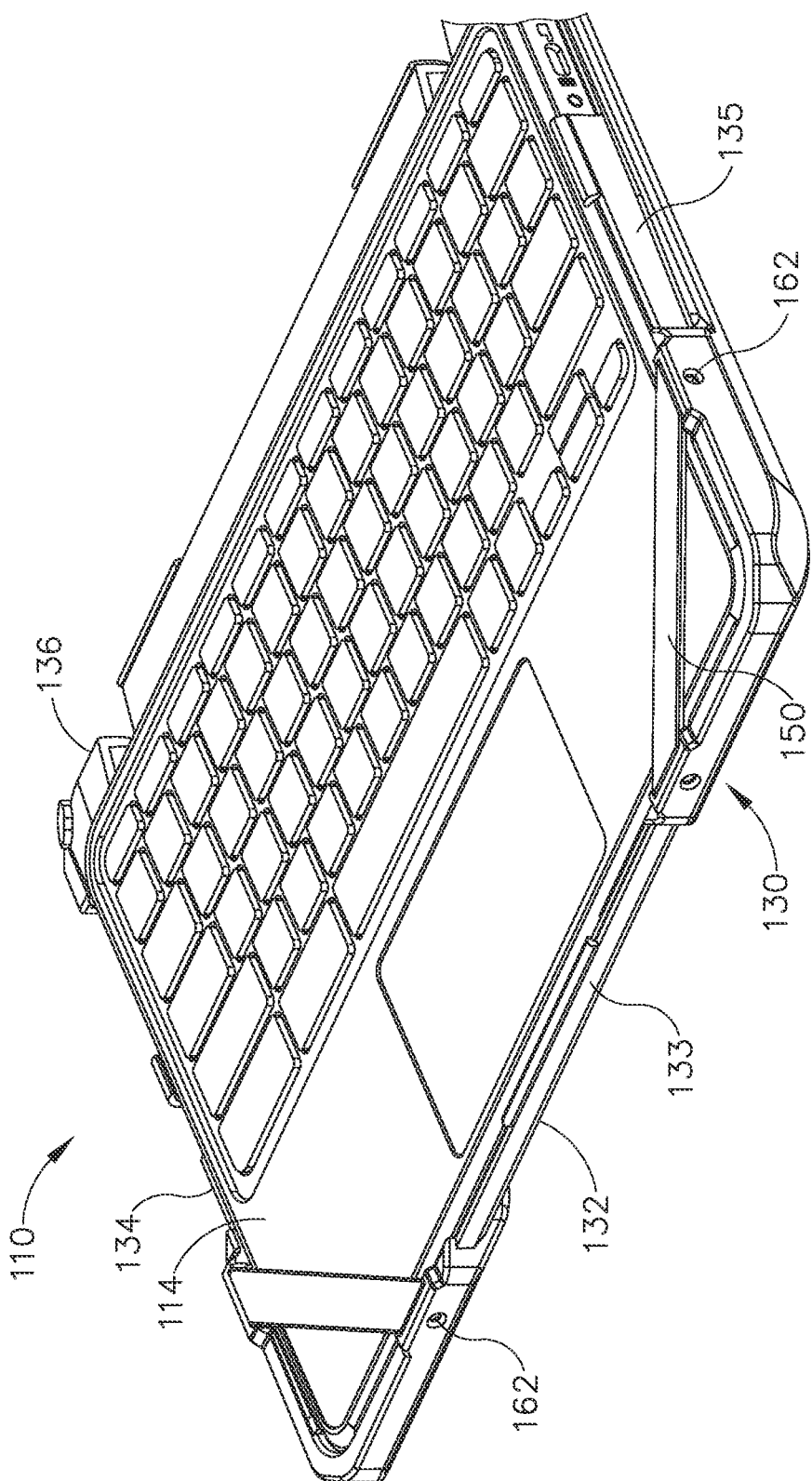
FIG. 7 is a perspective view of a keyboard portion of a laptop computer inside another protective cover of the invention.

FIG. 7 is a perspective view of a keyboard portion of a laptop computer 110 inside another protective cover 130 of the invention. The laptop computer 110 can be effectively operated while it is inside the protective cover 130, as shown in FIG. 7. The protective cover 130 comprises a planar bottom shell 132 for placement on a bottom surface of the keyboard portion 114. The bottom shell 132 has a front side 133, a left side 134, a right side 135, and a rear side 136 that wraps around the rear of the keyboard portion 114 to prevent it from moving backward. The protective cover further comprises at least one removable locking clip that attaches to the front, left or right side of the bottom shell when the keyboard portion is placed in the bottom shell. The at least one removable locking clip has at least one protruding flange that inserts into at least one slot in the front, left or right side of the bottom shell to internally lock the bottom shell to the keyboard portion. In the example shown in FIGS. 7-12, the protective cover 130 comprises two removable corner locking clips 150 that have protruding flanges 152 that insert into slots 154 in the front, left and right sides of the bottom shell to internally lock the bottom shell to the keyboard portion.

The protective cover 130 typically further comprises a planar top shell for placement on a top surface of the screen portion of the laptop computer. The top shell has a front side, a left side, a right side, and a rear side that wraps around the rear of the screen portion to prevent it from moving backward. The protective cover further comprises at least one removable locking clip that attaches to the front, left or right side of the top shell when the top shell is placed on the screen portion. The at least one removable locking clip has at least one protruding flange that inserts into at least one slot in the front, left or right side of the top shell to internally lock the top shell to the screen portion. In one example, the protective cover comprises two removable corner locking clips, such as locking clips 150, that have protruding flanges, such as protruding flanges 152, that insert into slots, such as slots 154, in the front, left and right side of the top shell to internally lock the top shell to the screen portion.

In another embodiment, a tool can be inserted into the at least one slot in the bottom shell to compress the at least one protruding flange of the at least one removable locking clip to unlock the bottom shell from the keyboard portion, and/or the tool can be inserted into the at least one slot in the top shell to compress the at least one protruding flange of the at least one removable locking dip to unlock the top shell from the screen portion. In the example shown in FIGS. 11-12, tool 160 can he inserted into slots 154 in the front, left and right sides of the bottom shell to compress the protruding flanges 152 of the removable locking clips 150 to unlock the bottom shell 132 from the keyboard portion 114. The same tool or a different tool can be inserted into the at least one slot in the top shell to compress the at least one protruding flange of the at least one removable locking clip to unlock the top shell from the screen portion. The tool may, or may not, be integrated into the protective cover for the laptop computer.

In another embodiment, the protective cover further comprises at least two holes in the bottom shell that hold removable screws that prevent the tool from being inserted into the at least one slot in the bottom shell to compress the at least one protruding flange to unlock the bottom shell from the keyboard portion, and/or at least two holes in the top shell that hold removable screws that prevent the tool from being inserted into the at least one slot in the top shell to compress the at least one protruding flange to unlock the top shell from the screen portion.

Figure 8:
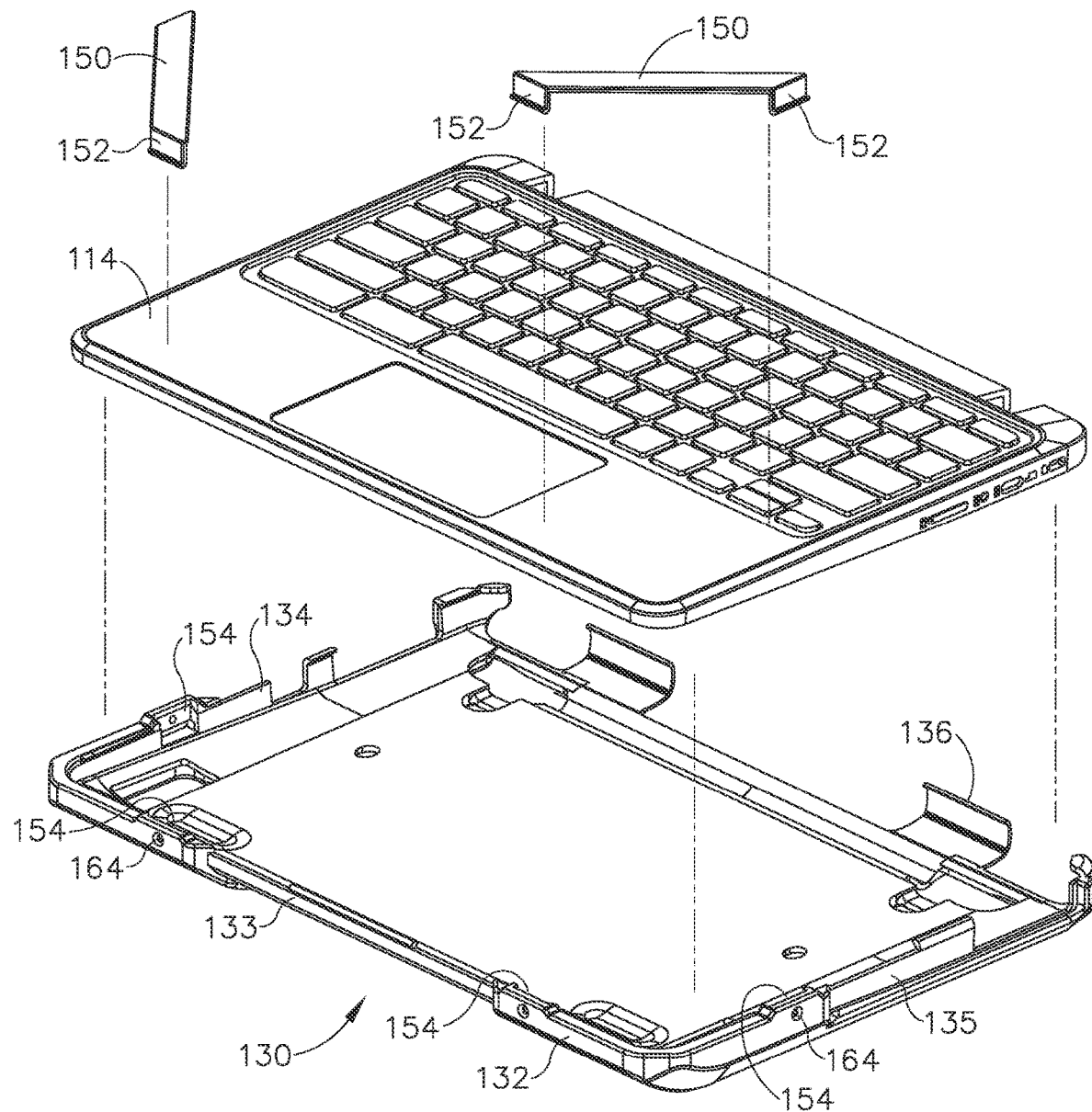
FIG. 8 is an exploded perspective view of the keyboard portion and protective cover of FIG. 7.
Figure 9:
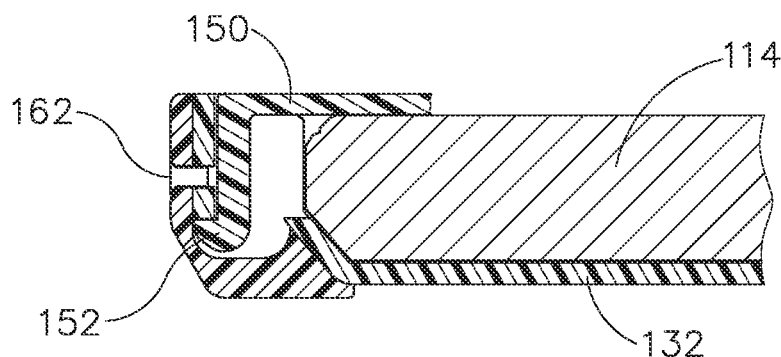
FIG. 9 is an enlarged sectional view of part of the keyboard portion and protective cover of FIG. 7, with a removable screw inserted into a hole in the bottom shell of the cover to prevent a tool from being inserted into a slot in the bottom shell to compress a protruding flange of the removable locking clip and unlock the bottom shell from the keyboard portion.
Figure 10:
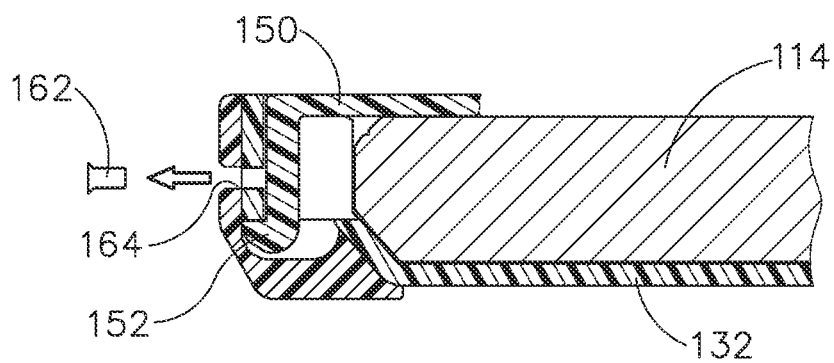
FIG. 10 is an enlarged sectional view of part of the keyboard portion and protective cover of FIG. 7, with a removable screw removed from a hole in the bottom shell of the cover so a tool can he inserted into a slot in the bottom shell to compress a protruding flange of the locking clip and unlock the bottom shell from the keyboard portion.
Figure 11:
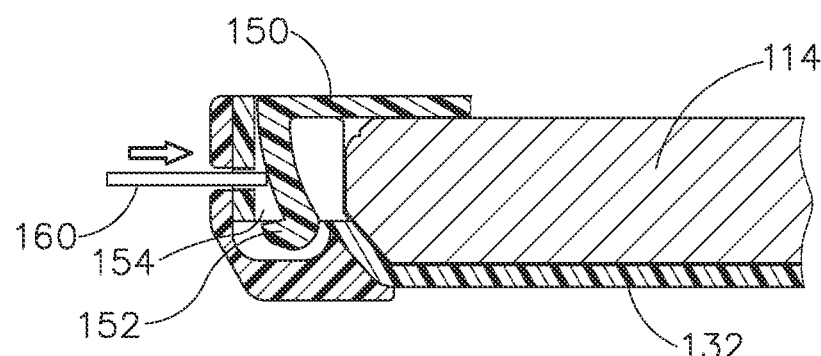
FIG. 11 is an enlarged sectional view of part of the keyboard portion and protective cover of FIG. 7, with a tool inserted into a slot in the bottom shell of the cover to compress a protruding flange of the locking clip and unlock the bottom shell from the keyboard portion.
Figure 12:
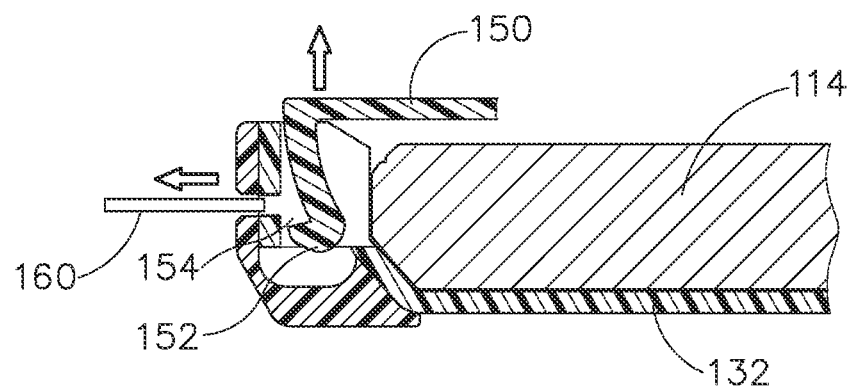
FIG. 12 is an enlarged sectional view of part of the keyboard portion and protective cover of FIG. 7, after a tool inserted into a slot in the bottom shell of the cover has compressed a protruding flange of the locking clip and unlocked the bottom shell from the keyboard portion.

As shown in FIGS. 7-9, removable screws 162 can be inserted in holes 164 in the bottom shell 132 of the cover to prevent a tool from being inserted into slots in the bottom shell to compress the protruding flanges of the locking clips 152 to unlock the bottom shell from the keyboard portion. FIGS. 10-12 show one screw 162 removed from hole 164 in the bottom shell of the cover so tool 160 can be inserted into slot 154 in the bottom shell to compress the protruding flange 152 of locking clip 150 to unlock the bottom shell 132 from the keyboard portion 114. After tool 160 has compressed the protruding flange of the locking clip to unlock the bottom shell from the keyboard portion, the tool can be removed, as shown in FIG. 12.

Figure 13:
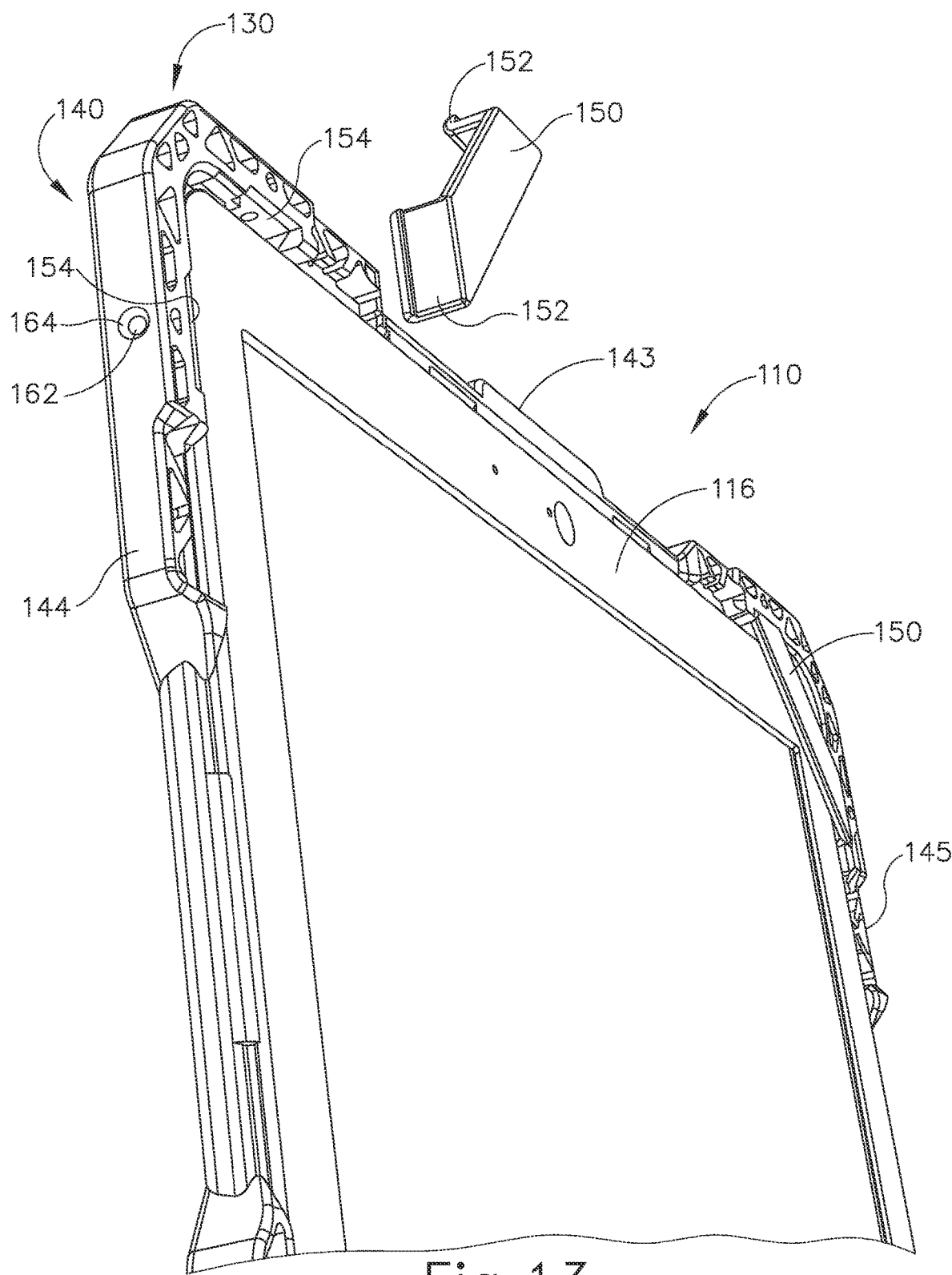
FIG. 13 is a perspective view of a screen portion of a laptop computer inside another protective cover of the invention.

FIG. 13 shows a screen portion 116 of laptop computer 110 inside protective cover 130. The laptop computer can be effectively operated while it is inside the protective cover. Protective cover 130 comprises a planar top shell 140 for placement on a top surface of screen portion 116. The top shell 140 has a front side 143, a left side 144, a right side 145, and a rear side (not shown) that wraps around the rear of the screen portion 116 to prevent it from moving backward. The protective cover further comprises at least one removable locking clip that attaches to the front, left or right side of the top shell when the screen portion is placed in the top shell. The at least one removable locking clip has at least one protruding flange that inserts into at least one slot in the front, left or right side of the top shell to internally lock the top shell to the screen portion. In the example shown in FIG. 13, the protective cover 130 comprises two removable corner locking clips 1.50 that have protruding flanges 152 that insert into slots 154 in the front, left and right sides of the top shell to internally lock the top shell to the screen portion.

As described above, a tool can be inserted into the at least one slot in the top shell to compress the at least one protruding flange of the at least one removable locking clip to unlock the top shell from the screen portion. For example, a tool such as tool 160 can be inserted into slots 1.54 in the front, left and right sides of the top shell to compress the protruding flanges 152 of the removable locking clips 150 and unlock the top shell 140 from the screen portion 116. As described above, the protective cover may further comprise at least two holes, such as holes 164, in the top shell that hold removable screws, such as screws 162, that prevent the tool from being inserted into the at least one slot in the top shell to compress the at least one protruding flange to unlock the top shell from the screen portion.

To further resist damage to the computer if it is dropped onto a hard surface or a heavy load placed on top of the computer, the top shell and the bottom shell of the protective cover may be comprised of a rigid layer and a resilient layer. For the bottom shell, a rigid layer may be nearer to the interior of the protective cover than a resilient layer. For other components, a resilient layer may be nearer to the interior. The bottom shell may be so designed because some laptop computers have ventilation ports through the bottom surfaces of their bottoms. A resilient layer adjacent to the bottom of such a computer might obstruct the ventilation ports. Otherwise, having a resilient layer adjacent the computer offers cushioning against shock should the computer be dropped. A flexible layer of polymeric material, such as polystyrene, for example, about 0.01 inches thick, may be inserted between rigid and resilient layers.

The materials employed in manufacturing the protective cover can be selected for light weight, durability and resistance to moisture. The material for rigid layers may be rigid polypropylene sheeting. Other materials, such as corrugated polymeric material, compressed wood fiber or metal sheet, may be employed. The material for resilient layers may be a polymeric foam material, such as polyethylene or polyurethane foam, e.g., a fairly dense grade of polyethylene foam. A fabric layer on the exterior of the protective cover may be a heavy-duty fabric, typically made of nylon, polyester or polyvinyl chloride. It may be bonded to a thin polymeric foam backing, which improves durability and water tightness. In one example, the cover has a ballistic nylon exterior to provide a high degree of protection and a rugged appearance. A vinyl exterior fabric may be used for a more fashionable appearance or to allow the cover to be wiped clean more easily. A lightweight, tightly woven nylon fabric may be used on the interior of the protective cover. In another embodiment of the invention, natural leather, synthetic leather or a sheet polymeric material such as polyvinyl chloride may be substituted for either or both of the fabric layers.

While the present invention may include a fabric layer, together with rigid and/or resilient layers, a protective cover could be constructed from a rigid shell, with resilient materials incorporated inside the shell. It would also be possible to fabricate such a protective cover from molded polyethylene foam with cloth coverings bonded to both sides.

Means for carrying the protective cover, and a laptop computer therein, may include a handle attached to bottom shell 32 of protective cover 30. A shoulder strap may also be attached to the bottom shell of the cover. An elastic strap, attached to the exterior surface of the bottom shell at the front and back and/or left and right may be provided to secure the computer and protective cover to one wrist of the user, while he/she operates the computer with the other hand.

In another embodiment, the invention relates to a combination a laptop computer as described above and a protective cover as described above.

While the present invention has been described with reference to certain embodiments, it will be appreciated that the invention is not limited thereby. Those skilled in the art will recognize that variations and modifications in the design and construction of a protective cover for a laptop computer, as described herein, lie within the spirit and scope thereof and all such variations and modifications fall within the scope of the invention defined by the following claims.

What is claimed is:

1. A protective cover for an electronic device, the protective cover comprising:
   a shell including upright sides that extend around at least a portion of a periphery of the shell, wherein the upright sides are configured to position the electronic device within the shell;
   a first slot and a second slot formed in the upright sides of the shell;
   a removable locking clip configured to be coupled to the upright sides and including a first flange and a second flange that are receivable within the first slot and the second slot, respectively;
   a first hole extending from the first slot through a portion of the upright sides, wherein the first hole is configured to receive a first screw; and
   a second hole extending from the second slot through a portion of the upright sides, wherein the second hole is configured to receive a second screw,
   wherein the removable locking clip overlaps a first portion of the electronic device when the electronic device is received within the shell and the first and second flanges are received within the first and second slots, respectively, and
   wherein, when the electronic device is received within the shell and the first and second flanges are received within the first and second slots, respectively, the shell is inhibited from being separated from the electronic device when the first screw is received within the first hole and engaged with the first flange, and the second screw is received within the second hole and engaged with the second flange.

2. The protective cover of claim 1, wherein the first hole defines a first axis and the second hole defines a second axis that is perpendicular to the first axis.

3. The protective cover of claim 1, wherein the removable locking clip includes a body portion configured to capture the first portion of the electronic device when the electronic device is received within the shell and the first and second flanges are received within the first and second slots, respectively, and wherein the first flange extends from a first end of the body portion and the second flange extends from a second opposite end of the body portion.

4. The protective cover of claim 1, wherein the first portion of the electronic device is a corner of the electronic device, and wherein the corner is disposed between the first flange and the second flange when the electronic device is received within the shell and the first and second flanges are received within the first and second slots, respectively.

5. The protective cover of claim 4, wherein the removable locking clip is a first removable locking clip, wherein the protective cover further includes
   a second removable locking clip having a third flange and a fourth flange, and
   a third slot and fourth slot formed in the upright sides,
   wherein the second removable locking clip overlaps a second portion of the electronic device when the electronic device is received within the shell and the third and fourth flanges are received within the third and fourth slots, respectively.

6. The protective cover of claim 5, further comprising a third hole extending from the third slot through a portion of the upright sides, wherein the third hole is configured to receive a third screw, and a fourth hole extending from the fourth slot through a portion of the upright sides, wherein the fourth hole is configured to receive a fourth screw.

7. The protective cover of claim 1, wherein each of the first and second flanges of the removable locking clip include a protrusion that engages a shoulder formed in each of the first and second slots when the first and second flanges are received within the first and second slots, respectively.

8. A protective cover for an electronic device, the protective cover comprising:
   a shell including upright wall sections configured to extend around at least a first portion of the electronic device;
   a plurality of slots disposed along the upright wall sections, each of the plurality of slots communicating with a respective hole of a plurality of holes extending through the upright wall sections; and
   a removable locking clip having a body portion, a first flange, and a second flange, wherein the first and second flanges are receivable within a pair of slots of the plurality of slots,
   wherein the first flange and the second flange are both disposed between the upright wall sections and the electronic device when the electronic device is received within the shell and the removable locking clip is coupled to the shell, and
   wherein the body portion overlaps a second portion of the electronic device to inhibit the electronic device from being removed from the shell when the electronic device is received within the shell and the removable locking clip is coupled to the shell.

9. The protective cover of claim 8, wherein each of the first and second flanges of the removable locking clip includes a protrusion, wherein a shoulder is formed in each of the first and second slots, and wherein the protrusions of the first and second flanges engage the shoulders formed in the first and second slots, respectively, when the removable locking clip is coupled to the shell.

10. The protective cover of claim 8, further comprising a plurality of fasteners receivable within the plurality of holes, wherein the plurality of fasteners is engageable with the first flange and the second flange to fixedly couple the removable locking clip to the shell.

11. The protective cover of claim 8, wherein the second portion of the electronic device is a corner of the electronic device, and wherein the corner is disposed between the first flange and the second flange when the electronic device is received within the shell and the removable locking clip is coupled to the shell.

12. The protective cover of claim 8, wherein the removable clip is a first removable clip, and the protective cover further includes a second removable clip having a body portion, a third flange, and a fourth flange, wherein the body portion of the second removable clip overlaps a third portion of the electronic device when the electronic device is received within the shell and the second removable locking clip is coupled to the shell.

13. The protective cover of claim 12, wherein the third flange and the fourth flange are both disposed between the upright wall sections and the electronic device when the electronic device is received within the shell and the second removable locking clip is coupled to the shell.

14. The protective cover of claim 12, wherein the third portion of the electronic device is a corner of the electronic device, and wherein the corner is disposed between the third flange and the fourth flange when the electronic device is received within the shell and the second removable locking clip is coupled to the shell.

15. The protective cover of claim 12, wherein the third and fourth flanges are receivable within another pair of slots of the plurality of slots.

16. A protective cover for an electronic device, the protective cover comprising:
- a shell including an upright wall section that forms a cavity configured to receive the electronic device;
- a plurality of slots disposed along the upright wall section, each of the plurality of slots defining a slot axis;
- a removable locking clip having a first flange and a second flange, wherein each of the first and second flanges is receivable within a respective slot of the plurality of slots along the slot axis;
- a plurality of holes extending through the upright wall section along a direction perpendicular to the slot axis, wherein each of the plurality of holes extends from one of the plurality of slots through the upright wall section and is configured to receive a fastener,
- wherein the first flange and the second flange are disposed between the upright wall section the electronic device when the electronic device is received within the shell and the removable locking clip is coupled to the shell, and
- wherein the fastener is configured to fixedly couple the removable locking clip to the shell to inhibit the electronic device from being separated from the shell when the electronic device is received within the shell and the removable locking clip is coupled to the shell.

17. The protective cover of claim 16, wherein the electronic device is configured to be inserted into the cavity along a direction parallel to the slot axis.

18. The protective cover of claim 16, wherein the fastener is a threaded screw.

19. The protective cover of claim 16, wherein each of the first and second flanges of the removable locking clip include a protrusion that engages a shoulder formed in each of the plurality of slots when the removable locking clip is coupled to the upright wall section.

20. The protective cover of claim 16, wherein each slot of the plurality of slots is formed as a cutout in the upright wall section.

* * * * *